US009671143B2

(12) United States Patent
Liang et al.

(10) Patent No.: US 9,671,143 B2
(45) Date of Patent: Jun. 6, 2017

(54) HEAT PUMP OF HEAT SOURCE TOWER FOR REALIZING SOLUTION REGENERATION AND HEAT REUTILIZATION BASED ON VACUUM BOILING

(71) Applicant: Southeast University, Nanjing (CN)

(72) Inventors: Caihua Liang, Nanjing (CN); Hua Gao, Nanjing (CN); Dongmei Jiang, Nanjing (CN); Xiaosong Zhang, Nanjing (CN)

(73) Assignee: Southeast University, Nanjing (CN)

( * ) Notice: Subject to any disclaimer, the term of this patent is extended or adjusted under 35 U.S.C. 154(b) by 294 days.

(21) Appl. No.: 14/432,464

(22) PCT Filed: Nov. 15, 2013

(86) PCT No.: PCT/CN2013/087177
§ 371 (c)(1),
(2) Date: Mar. 30, 2015

(87) PCT Pub. No.: WO2015/024312
PCT Pub. Date: Feb. 26, 2015

(65) Prior Publication Data
US 2015/0233616 A1     Aug. 20, 2015

(30) Foreign Application Priority Data
Aug. 19, 2013   (CN) .......................... 2013 1 0359554

(51) Int. Cl.
*F25B 30/02*       (2006.01)
(52) U.S. Cl.
CPC .................... *F25B 30/02* (2013.01)

(58) Field of Classification Search
CPC ............................... F25B 30/00; F25B 30/02
See application file for complete search history.

(56) References Cited

FOREIGN PATENT DOCUMENTS

CN     101776353 A   *   7/2010
CN     101776353 A      7/2010
(Continued)

OTHER PUBLICATIONS

PCT International Search Report, PCT/CN2013/087177, dated Aug. 6, 2014.

*Primary Examiner* — Emmanuel Duke
(74) *Attorney, Agent, or Firm* — TraskBritt P.C.

(57) ABSTRACT

The disclosure provides a heat source tower heat pump realizing solution regeneration and heat reutilization based on vacuum boiling. It comprises a refrigerant circuit, a solution circuit, a vacuum maintenance circuit, an air circuit, a regenerative solution heating circuit and a cold/hot water circuit. The unit provided by the disclosure regenerates a solution by taking full advantage of the characteristic that the boiling point of a solution will be reduced in vacuum, uses the heat released from the cooling of overheated refrigerant as the heat of solution regeneration and also uses the heat to produce heat supply hot water. While significantly raising the speed of solution regeneration, it also realizes efficient reutilization of solution regeneration heat, thoroughly solves the problem of solution regeneration of the heat pump of heat source tower system, improves the safety and reliability of the heat pump of heat source tower system in various operating conditions and realizes high overall efficiency of the system.

6 Claims, 1 Drawing Sheet

(56) References Cited

FOREIGN PATENT DOCUMENTS

| CN | 102901167 A | 1/2013 |
|----|-------------|--------|
| CN | 203478691 U | 3/2014 |
| JP | 2005233475 A | 9/2005 |
| JP | 2013019591 A | 1/2013 |
| WO | 2015024312 A1 | 2/2015 |

\* cited by examiner

HEAT PUMP OF HEAT SOURCE TOWER FOR REALIZING SOLUTION REGENERATION AND HEAT REUTILIZATION BASED ON VACUUM BOILING

CROSS-REFERENCE TO RELATED APPLICATIONS

This application is a national phase entry under 35 U.S.C. §371 of International Patent Application PCT/CN2013/087177, filed Nov. 15, 2013, designating the United States of America and published as International Patent Publication WO2015/024312 A1 on Feb. 26, 2015, which claims the benefit under Article 8 of the Patent Cooperation Treaty to Chinese Application Serial No. 201310359554.6, filed Aug. 19, 2013, the disclosure of each of which is hereby incorporated herein in its entirety by this reference.

TECHNICAL FIELD

The disclosure pertains to the field of design and manufacturing of refrigeration and air conditioning systems, and relates to a heat pump unit of heat source tower, which regenerates a solution and realizes comprehensive and efficient utilization of regenerated heat by taking advantage of the characteristic that the boiling point of a solution will be reduced in vacuum.

BACKGROUND

With the development of economy, people continuously raise their living standard and their requirements for the comfort of working and living environments are getting higher, too. Due to historical reason, according to the heat engineering climatic zoning of China, central heating mode is not adopted in the region with hot summer and cold winter. This region is populous and economically developed, and thereby has extremely strong demand for building heating and cooling. In the recent years, greater voice is heard for heating in winter, but in the face of rigid demand, whether this region can copy the central heating mode of northern China is a problem. From the perspective of energy consumption, this will render the situation of energy shortage in China grimmer, even unbearable. Therefore, it is particularly necessary to develop a solution of cold and heat source for buildings, which is suitable to the regions with climatic features of hot summer and cold winter.

A heat pump system of heat source tower may realize high efficiency of the water-cooled chiller set in summer and realize heating in winter by using a solution to absorb heat from air in the heat source tower as a low-grade heat source of the heat pump. It may avoid the problems of the existing air source heat pump solutions, including low refrigeration efficiency in summer and frosting during refrigeration in winter. The solution of "water chilling set+boiler" has the problem of low use rate of the chiller set, while a ground source heat pump has special requirements for geographic and geologic conditions. In comparison, when a heat pump system of heat source tower generates heat in winter, it uses a solution to exchange heat with air in the heat source tower. In this process, as there is a partial pressure difference between the water vapor in the air and the water vapor on solution surface, the moisture in the air will enter the solution to dilute the solution and raise the freezing point of the solution. In order to ensure the operation of the system is safe and reliable, the moisture absorbed by the solution from the air needs to be discharged from the solution in order to increase concentration of the solution, i.e., realize regeneration of the solution. The solution regeneration process needs to absorb heat. Meanwhile during solution regeneration, water is evaporated from the solution. A conventional regeneration method uses water evaporation and the solution regeneration speed is low. The solution regeneration speed limits the application scale of the heat pump system of heat source tower, otherwise the system will be prone to a safety problem when operated in a low-temperature high-humidity environment in winter. In addition, the source and utilization way of the heat for solution regeneration also influence the overall performance of the system. Obviously, how to obtain a heat source for solution regeneration, realize efficient utilization of regenerated heat of the solution and ensure fast regeneration of the solution during operation of the system is a matter of significance to improve the performance of the heat pump of heat source tower system and ensure safe and reliable operation of the system.

Therefore, designing a new-type efficient heat pump system of heat source tower to solve problems that the heat source from solution regeneration of a heat pump system of heat source tower and efficient utilization of regenerated heat from the solution and realize fast regeneration and high overall efficiency of the heat pump system of heat source tower becomes an urgent technical problem that needs to be solved by the person skilled in the art.

BRIEF SUMMARY

Technical Problem

The object of the disclosure is to provide a heat pump of heat source tower for realizing solution regeneration and heat reutilization based on vacuum boiling, which can efficiently solve the problem of solution regeneration of a heat pump system of heat source tower and increase operating efficiency of the heat pump system of heat source tower in various operating conditions.

Technical Solution

A heat pump of heat source tower provided by the disclosure, which realizes solution regeneration and heat reutilization based on vacuum boiling, comprising a refrigerant circuit, a solution circuit, a vacuum maintenance circuit, an air circuit, a regenerative solution heating circuit and a cold/hot water circuit.

The refrigerant circuit comprises a compressor, a first solenoid valve, a second solenoid valve, a first heat exchanger, a four-way valve, a second heat exchanger, a first check valve, a second check valve, a reservoir, a filter, an electronic expansion valve, a third check valve, a fourth check valve, a third heat exchanger, a gas-liquid separator and relevant connecting pipelines. Meanwhile, the first heat exchanger is also a component of the regenerative solution heating circuit, the second heat exchanger is also a component of the solution circuit, and the third heat exchanger is also a component of the cold/hot water circuit.

In the refrigerant circuit, the output end of the compressor is divided into two channels. One channel is connected to the first input end of the first heat exchanger via the second solenoid valve. The other channel is connected to the first input end of the four-way valve via the first solenoid valve. The first input end of the four-way valve is also connected to the first output end of the first heat exchanger. The first output end of the four-way valve is connected to the first input end of the second heat exchanger. The first output end of the second heat exchanger is connected to the inlet of the first check valve. The outlet of the first check valve is divided into two channels. One channel is connected to the input end of the reservoir. The other channel is connected to the outlet of the second check valve. The inlet of the second check valve is also connected to the first output end of the third heat exchanger. The output end of the reservoir is connected to the input end of the electronic expansion valve via the filter. The output end of the electronic expansion valve is divided into two channels. One channel is connected to the inlet of the third check valve. The other channel is connected to the inlet of the fourth check valve. The outlet of the third check valve is connected to the first output end of the third heat exchanger. The outlet of the fourth check valve meanwhile is connected to the first output end of the second heat exchanger and the inlet of the first check valve. The first input end of the third heat exchanger is connected to the second input end of the four-way valve. The second output end of the four-way valve is connected to the input end of the gas-liquid separator. The output end of the gas-liquid separator is connected to the input end of the compressor.

The solution circuit comprises a second heat exchanger, a solution boiling regenerator, a first solution pump, a heat recoverer, a fifth solenoid valve, a sixth solenoid valve, a solution reservoir, a seventh solenoid valve, a heat source tower, a second solution pump, an electric regulating valve and relevant connecting pipelines. The solution boiling regenerator meanwhile is a component of the air circuit and the vacuum maintenance circuit.

In the solution circuit, the output end of the heat source tower solution is connected to the inlet of the second solution pump, the outlet of the second solution pump is connected to the input end of the electric three-way regulating valve, the first output end of the electric three-way regulating valve is connected to the first input end of the heat recoverer, the first output end of the heat recoverer is connected to the first input end of the solution boiling regenerator, the first output end of the solution boiling regenerator is connected to the second input end of the heat recoverer via the first solution pump, the second output end of the heat recoverer is divided into two channels, one channel is connected to the first input end of the heat source tower via the sixth solenoid valve, the other channel is connected to the input end of the solution reservoir via the fifth solenoid valve, the output end of the solution reservoir is connected to the second input end of the heat source tower via the seventh solenoid valve, the second output end of the electric three-way regulating valve is connected to the second input end of the second heat exchanger, and the second output end of the second heat exchanger is also connected to the first input end of the heat source tower.

The vacuum maintenance circuit comprises a solution boiling regenerator, a regulating valve, a compensator, a third solenoid valve, a vacuum pump and relevant connecting pipelines. In the vacuum maintenance circuit, the regulating end of the solution boiling regenerator is connected to the first port of the compensator via the regulating valve, and the second port of the compensator is connected to the inlet of the vacuum pump via the third solenoid valve.

The air circuit comprises a finned tube heat exchanger, a solution boiling regenerator and a fan which are connected successively as well as the pipelines connecting the finned tube heat exchanger, the solution boiling regenerator and the fan. They form a circulation circuit. The condensed water output end of the finned tube heat exchanger is connected to the input end of the water storage tank via the eighth solenoid valve. The output end of the water storage tank is connected to the ninth solenoid valve. The finned tube heat exchanger meanwhile is also a component of the cold/hot water circuit.

The regenerative solution heating circuit comprises a second water pump, a solution boiling regenerator, a first heat exchanger and relevant connecting pipelines. In the regenerative solution heating circuit, the second output end of the first heat exchanger is connected to the second input end of the solution boiling regenerator, the second output end of the solution boiling regenerator is connected to the inlet of the second water pump, and the outlet of the second water pump is connected to the second input end of the first heat exchanger.

The cold/hot water circuit comprises a first water pump, a third solenoid valve, a finned tube heat exchanger, a third heat exchanger and relevant connecting pipelines. In the cold/hot water circuit, the inlet of the first water pump is connected to the return end of the heat pump unit of heat source tower, the outlet of the first water pump is divided into two channels, one channel is connected to the second input end of the third heat exchanger, the other channel is connected to the input end of the finned tube heat exchanger hot/cold water via the third solenoid valve, the output end of the finned tube heat exchanger hot/cold water is connected to the water supply end of the heat pump unit of heat source tower, and the second output end of the third heat exchanger is also connected to the water supply end of the heat pump unit of heat source tower.

In the disclosure, the flow of the solution entering the second heat exchanger and the heat recoverer is regulated by controlling the electric three-way regulating valve so as to control the flow, temperature and concentration of the solution entering the boiling solution regenerator. Consequently, while the heat pump unit of heat source tower achieves optimum regeneration efficiency, the concentration of the flowing solution is maintained stable.

In the disclosure, the working pressure in the solution boiling regenerator is regulated by using the compensator and the regulating valve so as to control the regeneration temperature and speed of the solution.

In the disclosure, the heat released from the cooling of overheated refrigerant in the first heat exchanger is used as regeneration heat of the solution. Based on the regenerative solution heating circuit, the solution in the solution boiling regenerator is heated and boiled up to realize solution regeneration.

In the disclosure, in the finned tube heat exchanger in the air circuit, the heat released from condensation of water in the air is used to heat the hot water in the cold/hot water circuit and realize reutilization of solution regeneration heat.

In the disclosure, the air outlet of the heat source tower has the function of automatic opening and closing. In working time, the air outlet is automatically opened. In non-working time, it is automatically closed to prevent rainwater from entering the tower.

During cooling operation of the heat pump of heat source tower in summer, the compressor sucks in low-temperature low-pressure refrigerant gas from the gas-liquid separator and compresses it into high-temperature high-pressure overheated steam. The high-temperature high-pressure overheated steam is discharged, passes through the first solenoid valve (at this moment, the second solenoid valve is closed) and the four-way valve and enters into the second heat exchanger where the refrigerant releases heat and is condensed into liquid. The liquid then successively passes through the first check valve, the reservoir, the filter and the electronic expansion valve and becomes low-temperature low-pressure gas-liquid two-phase. Then it enters into the third heat exchanger via the third check valve. The refrigerant absorbs heat and is evaporated in the third heat exchanger to generate cold water. After complete evaporation, the refrigerant becomes overheated gas. The gas comes out from the third heat exchanger, passes through the four-way valve and enters into the gas-liquid separator. Then again it is sucked into the compressor. By now, a cooling cycle is completed and chilled water is produced. At the moment, the solution circuit is filled with cooling water and the parts of the solution circuit stop working except the heat source tower, the second solution pump, the electric three-way regulating valve and the second heat exchanger. In the solution circuit, after coming out from the heat source tower, the cooling water is sucked in and pressurized by the second solution pump. Then it enters into the electric three-way regulating valve. The cooling water all enters into the second heat exchanger from the second output end of the electric three-way regulating valve. In the second heat exchanger, the cooling water absorbs heat to condense the refrigerant into liquid. After the temperature of the refrigerant rises, it flows out from the second heat exchanger and enters into the heat source tower to perform heat and humidity exchange with air. After the temperature drops, the cooling water again flows out from the heat source tower. The chilled water in the cold/hot water circuit enters into the heat pump unit of heat source tower from the return end of the heat pump unit of heat source tower, then passes through the first water pump and enters into the third heat exchanger (at this moment, the third solenoid valve is closed). In the third heat exchanger, the chilled water exchanges heat with the refrigerant and its temperature drops. After coming out from the third heat exchanger, it flows out from the water supply end of the heat pump unit of heat source tower. In this mode, none of the air circuit, the regenerative solution heating circuit and the vacuum maintenance circuit works.

The heating operation of the heat pump of heat source tower in winter has three modes. Heating operation mode 1: The heating operation of the heat pump of heat source tower operates in winter. When the humidity of the air is low or the amount of the water entering into the solution from air in the heat source tower is small, or in other words, the solution does not need to be regenerated, the compressor sucks in refrigerant gas with low temperature and low pressure from the gas-liquid separator and compresses it into overheated steam with high temperature and high pressure. The overheated steam with high temperature and high pressure is discharged, passes through the first solenoid valve (at the moment, the second solenoid valve is closed) and the four-way valve and enters into the third heat exchanger where the refrigerant releases heat to produce hot water and the refrigerant itself is condensed into liquid. The liquid then passes through the second check valve, the reservoir, the filter and the electronic expansion valve and becomes low-temperature low-pressure gas-liquid two-phase. Then it enters the second heat exchanger via the fourth check valve. The refrigerant absorbs heat and is evaporated in the second heat exchanger. After complete evaporation, the refrigerant becomes overheated gas. The overheated gas comes out from the second heat exchanger, passes through the four-way valve and enters into the gas-liquid separator. Then again it is sucked into the compressor. By now, a heating cycle is completed and hot water is produced. At the moment, the solution circuit is filled with the solution and the parts of the solution circuit stop working except the heat source tower, the second solution pump, the electric three-way regulating valve and the second heat exchanger. In the solution circuit, after coming out from the heat source tower, the solution is sucked in and pressurized by the second solution pump. Then it enters into the electric three-way regulating valve. The solution all enters into the second heat exchanger from the second output end of the electric three-way regulating valve. In the second heat exchanger, it exchanges heat with the refrigerant to release heat. After temperature drop, it flows out from the second heat exchanger and enters into the heat source tower to perform heat and humidity exchange with air. After the temperature of the solution rise, it again flows out from the heat source tower. The hot water in the cold/hot water circuit enters into heat source tower heat pump unit from the return end of the heat pump unit of heat source tower, then passes through the first water pump and enters into the third heat exchanger (at the moment, the third solenoid valve is closed). In the third heat exchanger, the hot water exchanges heat with the refrigerant and its temperature rises. After coming out from the third heat exchanger, it flows out from the water supply end of the heat pump unit of heat source tower. In this mode, none of the air circuit, the regenerative solution heating circuit and the vacuum maintenance circuit works.

Heating operation mode 2: When the humidity of the air is high or the amount of the water entering into the solution from air in the heat source tower is large, the solution needs to be regenerated, the refrigerant gas with low temperature and low pressure in the gas-liquid separator in the refrigerant circuit is sucked in and compressed by the compressor and then discharged into the first heat exchanger via the second solenoid valve (at the moment, the first solenoid valve is closed). The refrigerant in the first heat exchanger exchanges heat with the water, which is used to heat the solution in the solution boiling regenerator. After temperature drop, the refrigerant flows out from the first heat exchanger, passes through the four-way valve and enters into the third heat exchanger where the refrigerant releases heat to produce hot water and be condensed into liquid. The liquid then passes through the second check valve, the reservoir, the filter and the electronic expansion valve successively. After throttling and pressure drop, the refrigerant in gas-liquid two-phase enters into the second heat exchanger via the fourth check valve. In the second heat exchanger, it exchanges heat with the solution, absorbs heat and is evaporated. After complete evaporation, the refrigerant comes out from the second heat exchanger, flows through the four-way valve and enters into the gas-liquid separator. Again it is sucked in and compressed by the compressor, thus completing a cycle. At the moment, the solution circuit is filled with the solution. After coming out from the heat source tower, the solution enters into the second solution pump and is pressurized by the second solution pump. Then it enters into the electric three-way regulating valve. In the electric three-way regulating valve, the solution is divided into two channels. In one channel, the solution flows out from the second output end of the electric three-way regulating valve and enters into the second heat exchanger where it exchanges heat with the refrigerant to release heat. After temperature drop, the solution comes out from the second heat exchanger and returns to the heat source tower. In the other channel, the solution flows out from the first output end of the electric three-way regulating valve and enters into the heat recoverer where it exchanges heat with the solution flowing into the heat recoverer from the solution boiling regenerator. After temperature rise, the solution comes out from the heat recoverer and enters into the solution boiling regenerator where the solution is heated and boiled up and the water in the solution is evaporated. After concentration rise, the solution flows out from the first output end of the solution boiling regenerator, is pressurized in the first solution pump and then enters into the heat recoverer where its temperature is reduced. After coming out from the heat recoverer, the solution returns to the heat source tower via the sixth solenoid valve (at the moment, the fifth solenoid valve and the seventh solenoid valve are closed).

In the regenerative solution heating circuit, the water exchanges heat with the refrigerant in the first heat exchanger and temperature of the water rises. After coming out from the first heat exchanger, water enters into the solution boiling regenerator where it exchanges heat with the solution. After temperature drop, water flows out from the solution boiling regenerator and is sucked in and pressurized by the second water pump. Then it again flows into the first heat exchanger. It circulates in this way.

In the vacuum maintenance circuit, the vacuum pump is used to vacuumize the compensator and keep the pressure in the compensator within the set pressure range. When the pressure in the compensator is lower than the set value, the vacuum pump does not work and the fourth solenoid valve is closed. When the pressure in the compensator is higher than the set value, the vacuum pump works and the fourth solenoid valve is opened; the compensator and the pressure regulating valve are used to regulate the working pressure in the air circuit, i.e., control the working pressure in the solution boiling regenerator, keep the solution in the solution boiling regenerator boiling all the time and realize fast regeneration of the solution. When the air circuit works, its internal pressure is lower than atmospheric pressure and is in a vacuum state and the solution in the solution boiling regenerator is heated. Under working pressure in the air circuit, the solution will boil up and steam will enter into the air circuit to form highly humid air. After flowing out from the solution boiling regenerator, the highly humid air enters into the finned tube heat exchanger. In the finned tube heat exchanger, it exchanges heat with heat supply hot water to produce heat supply hot water (45° C. supply/40° C. return). The temperature of the highly humid air is reduced to below dew point, the water vapor in the air is condensed and the moisture content of the air is reduced. After flowing out from the finned tube heat exchanger, the air is sucked in and pressurized by fan and then enters into the solution boiling regenerator. It circulates in this way. At the moment, the eighth solenoid valve is opened, the ninth solenoid valve is closed and the water storage tank is in a water receiving state. When the level reaches a specific height, the eighth solenoid valve is closed and the ninth solenoid valve is opened. After the water in the water storage tank is drained, the ninth solenoid valve is closed again and the eighth solenoid valve is opened. In the cold/hot water circuit, hot water enters into the heat pump unit of heat source tower from the return end of the heat pump unit of heat source tower and then enters into the first water pump where hot water is divided into two channels. In one channel, the hot water enters into the third heat exchanger to exchange heat with the refrigerant and raise temperature. After coming out from the third heat exchanger, it flows out from the water supply end of the heat pump unit of heat source tower. In the other channel, the hot water enters into the finned tube heat exchanger via the third solenoid valve to exchange heat with the air in it and raise temperature to 45° C. After coming out from the finned tube heat exchanger, the hot water is mixed with the hot water coming out from the third heat exchanger and finally flows out from the water supply end of the heat pump unit of heat source tower.

When the heat supply of the heat pump of heat source tower in winter is about to end, the heating operation of the system adopts heating operation mode 3: mode of highly concentrated solution: The operation of other circuits are the same as that in mode 2. Only in the solution circuit, the fifth solenoid valve is opened, the sixth solenoid valve and the seventh solenoid valve are closed, the solution flowing out from the second output end of the heat recoverer passes through the fifth solenoid valve and flows into the solution reservoir for storage rather than flows into the heat source tower again. When the unit carries out heating operation in winter again and the solution in the solution reservoir needs to flow into the heat source tower, the fifth solenoid valve is closed and the seventh solenoid valve is opened.

In heating operation mode 1 of the system, there is no need to regenerate the solution and the system runs efficiently without initiation of solution regeneration.

In heating operation mode 2 of the system, solution regeneration uses the heat released from the cooling of overheated refrigerant. By controlling the electric three-way regulating valve, the flow of the solution entering into the second heat exchanger and the heat recoverer is regulated, thus the volume of the solution to be regenerated is regulated and the flow, temperature and concentration of the solution entering into the solution boiling regenerator are controlled. Meanwhile, by using the vacuum maintenance circuit, the working pressure of the air circuit, i.e., the pressure in the solution boiling regenerator is regulated, it is ensured that the solution in the solution boiling regenerator can be heated till boiling under this pressure and meanwhile the operating temperature in each part of the closed air circuit is regulated. As a result, while the system achieves optimum regeneration efficiency, the concentration of the flowing solution is maintained stable. Further, the heat released by water vapor in the air through condensation in the finned tube heat exchanger in the air circuit is used to heat the heat supply hot water and realize efficient utilization of regenerated heat.

Beneficial Effect

Compared with prior art, the disclosure has the following advantages:

The heat pump of heat source tower provided in the disclosure, which realizes solution regeneration and heat reutilization based on vacuum boiling, regenerates a solution by taking full advantage of the characteristic that the boiling point of a solution will be reduced in vacuum, uses the heat released from the cooling of overheated refrigerant as the heat for solution regeneration and also uses the heat to produce heat supply hot water. While significantly raising the speed of solution regeneration, it also realizes efficient reutilization of solution regeneration heat, thoroughly solves the problem of solution regeneration of the heat pump of heat source tower system, improves the safety and reliability of the heat pump of heat source tower system in various operating conditions and realizes high overall efficiency of the system.

Figure 1:
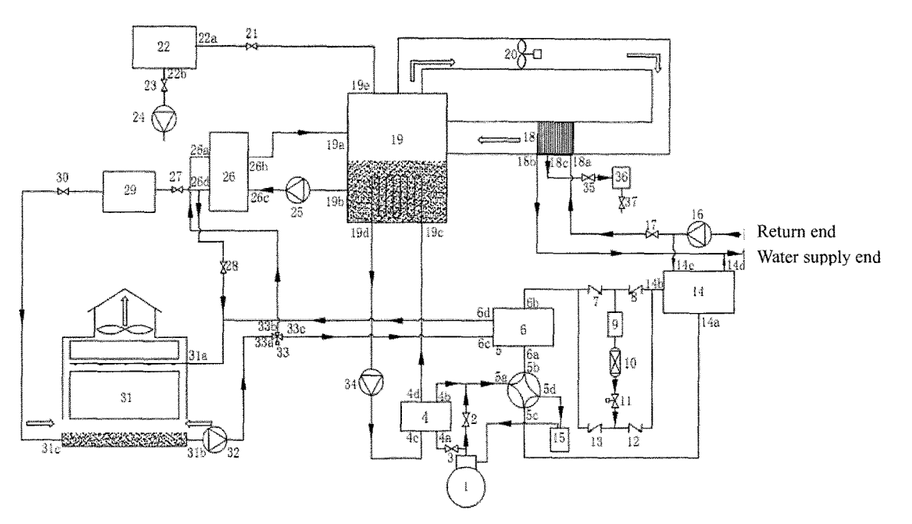
The FIGURE is a schematic view of a heat pump of heat source tower provided in the disclosure, which realizes solution regeneration and heat reutilization based on vacuum boiling.

In the FIGURE, there is: a compressor 1; a first solenoid valve 2; a second solenoid valve 3; a first heat exchanger 4; a first input end 4a of the first heat exchanger; a first output end 4b of the first heat exchanger; a second input end 4c of the first heat exchanger; a second output end 4d of the first heat exchanger; a four-way valve 5; a first input end 5a of the four-way valve; a first output end 5b of the four-way valve; a second input end 5c of the four-way valve; a second output end 5d of the four-way valve; a second heat exchanger 6; a first input end 6a of the second heat exchanger; a first output end 6b of the second heat exchanger; a second input end 6c of the second heat exchanger; a second output end 6d of the second heat exchanger; a first check valve 7; a second check valve 8; a reservoir 9; a filter 10; an electronic expansion valve 11; a third check valve 12; a fourth check valve 13; a third heat exchanger 14; a first input end 14a of the third heat exchanger; a first output end 14b of the third heat exchanger; a second input end 14c of the third heat exchanger; a second output end 14d of the third heat exchanger; a gas-liquid separator 15; a first water pump 16; a third solenoid valve 17; a finned tube heat exchanger 18; an input end 18a of finned tube heat exchanger hot/cold water; an output end 18b of finned tube heat exchanger hot/cold water; a condensed water output end 18c of the finned tube heat exchanger; a solution boiling regenerator 19; a first input end 19a of the solution boiling regenerator; a first output end 19b of the solution boiling regenerator; a second input end 19c of the solution boiling regenerator; a second output end 19d of the solution boiling regenerator; a pressure regulating end 19e of the solution boiling regenerator; a fan 20; a regulating valve 21; a compensator 22; a first port 22a of the compensator; a second port 22b of the compensator; a fourth solenoid valve 23; a vacuum pump 24; a first solution pump 25; a heat recoverer 26; a first input end 26a of the heat recoverer; a first output end 26b of the heat recoverer; a second input end 26c of the heat recoverer; a second output end 26d of the heat recoverer; a fifth solenoid valve 27; a sixth solenoid valve 28; a solution reservoir 29; a seventh solenoid valve 30; a heat source tower 31; a first input end 31a of the heat source tower; an output end 31b of the heat source tower; a second input end 31c of the heat source tower; a second solution pump 32; an electric three-way regulating valve 33; an input end 33a of the electric three-way regulating valve; a first output end 33b of the electric three-way regulating valve; a second output end 33c of the electric three-way regulating valve; a second water pump 34; an eighth solenoid valve 35; a water storage tank 36; a ninth solenoid valve 37.

DETAILED DESCRIPTION

Below the one embodiment of the disclosure is further described by referring to the FIGURE.

The heat pump of heat source tower provided in the disclosure, which realizes solution regeneration and heat reutilization based on vacuum boiling, comprises a refrigerant circuit, a solution circuit, a vacuum maintenance circuit, an air circuit, a regenerated heat utilization circuit and a cold/hot water circuit. The detail connection method is as follows: The output end of the compressor 1 is divided into two channels. One channel is connected to the first input end 4a of the first heat exchanger via the second solenoid valve 3. The other channel is connected to the first input end 5a of the four-way valve via the first solenoid valve 2. The first input end 5a of the four-way valve is also connected to the first output end 4b of the first heat exchanger, and the first output end 5b of the four-way valve is connected to the first input end 6a of the second heat exchanger. The first output 6b end of the second heat exchanger is connected to the inlet of the first check valve 7. The outlet of the first check valve 7 is divided into two channels. One channel is connected to the input end of the reservoir 9. The other channel is connected to the outlet of the second check valve 8. The inlet of the second check valve 8 is connected to the first output end 14b of the third heat exchanger. The output end of the reservoir 9 is connected to the input end of the electronic expansion valve 11 via the filter 10. The output end of the electronic expansion valve 11 is divided into two channels. One channel is connected to the inlet of the third check valve 12. The other channel is connected to the inlet of the fourth check valve 13. The outlet of the third check valve 12 is connected to the first output end 14b of the third heat exchanger. The outlet of the fourth check valve 13 meanwhile is connected to the first output end 6b of the second heat exchanger and the inlet of the first check valve 7. The first input end 14a of the third heat exchanger is connected to the second input end 5c of the four-way valve. The second output end 5d of the four-way valve is connected to the input end of the gas-liquid separator 15. The output end of the gas-liquid separator 15 is connected to the input end of the compressor 1.

The output end 31b of heat source tower solution is connected to the inlet of the second solution pump 32. The outlet of the second solution pump 32 is connected to the input end 33a of the electric three-way regulating valve. The first output end 33b of the electric three-way regulating valve is connected to the first input end 26a of the heat recoverer. The first output end 26b of the heat recoverer is connected to the first input end 19a of the solution boiling regenerator. The first output end 19b of the solution boiling regenerator is connected to the second input end 26c of the heat recoverer via the first solution pump 25. The second output end of the heat recoverer 26d is divided into two channels. One channel is connected to the first input end 31a of the heat source tower via the sixth solenoid valve 28. The other channel is connected to the input end of solution reservoir 29 via the fifth solenoid valve 27. The output end of the solution reservoir 29 is connected to the second input end 31c of the heat source tower via the seventh solenoid valve 30. The second output end 33c of the electric three-way regulating valve is connected to the second input end 6c of the second heat exchanger. The second output end 6d of the second heat exchanger is also connected to the first input end 31a. of the heat source tower.

The pressure regulating end 19e of the solution boiling regenerator is connected to the first port 22a of the compensator via the pressure regulating valve 21. The second port 22b of the compensator is connected to the vacuum pump 24 via the third solenoid valve 23.

In the air circuit, the solution boiling regenerator 19 is connected to the finned tube heat exchanger 18 and the fan 20 successively. They form a circulation circuit through pipelines. The condensed water output end 18c of the finned tube heat exchanger is connected to the input end of the water storage tank 36 via the eighth solenoid valve 35. The output end of the water storage tank 36 is connected to the ninth solenoid valve 37.

In the regenerative solution heating circuit, the second output end 4d of the first heat exchanger is connected to the second input end 19c of the solution boiling regenerator, the second output end 19d of the solution boiling regenerator is connected to the inlet of the second water pump 34, and the outlet of the second water pump 34 is connected to the second input end 4*c* of the first heat exchanger.

In the cold/hot water circuit, the inlet of the first water pump 17 is connected to the return end of the heat pump unit of heat source tower, the outlet of the first water pump 17 is divided into two channels, one channel is connected to the second input end 14*c* of the third heat exchanger, the other channel is connected to the hot/cold water input end 18*a* of the finned tube heat exchanger via the third solenoid valve 17, the hot/cold water 18*b* output end of the finned tube heat exchanger is connected to the water supply end of the heat pump unit of heat source tower, and the second output end 4*d* of the third heat exchanger is also connected to the water supply end of the heat pump unit of heat source tower.

During cooling operation of the heat pump of heat source tower in summer, the compressor 1 sucks refrigerant gas with low temperature and low pressure from the gas-liquid separator 15 and compresses it into overheated steam with high temperature and high pressure. The overheated steam with high temperature and high pressure is discharged, passes through the first solenoid valve 2 (at the moment, the second solenoid valve 3 is closed) and the four-way valve 5 and enters into the second heat exchanger 6 where the refrigerant releases heat and is condensed into liquid. The liquid then passes through the first check valve 7, the reservoir 9, the filter 10 and the electronic expansion valve 11 and becomes gas-liquid two-phase with low temperature and low pressure. Then it enters into the third heat exchanger 14 via the third check valve 12. The refrigerant absorbs heat and is evaporated in the third heat exchanger 14 to produce cold water. After complete evaporation, the refrigerant becomes overheated gas, which comes out from the third heat exchanger 14, passes through the four-way valve 5 and enters into the gas-liquid separator 15. Then again it is sucked into the compressor 1. By now, a cooling cycle is completed and chilled water is produced. At the moment, the solution circuit is filled with cooling water and the parts of the solution circuit except the heat source tower 31, the second solution pump 32, the electric three-way regulating valve 33 and the second heat exchanger 6 stop working. In the solution circuit, after coming out from the heat source tower 31, the cooling water is sucked in and pressurized by the second solution pump 32. Then it enters into the electric three-way regulating valve 33. The cooling water all enters into the second heat exchanger 6 from the second output end 33*c* of the electric three-way regulating valve. In the second heat exchanger 6, the cooling water absorbs heat to condense the refrigerant into liquid. After its temperature rises, it flows out from the second heat exchanger 6 and enters into the heat source tower 31 to perform heat and humidity exchange with air. After temperature drop, the cooling water again flows out from the heat source tower 31. The chilled water in the cold/hot water circuit enters into the heat pump unit of heat source tower from the return end of the heat pump unit of heat source tower, then passes through the first water pump 16 and enters into the third heat exchanger 14 (at the moment, the third solenoid valve 17 is closed). In the third heat exchanger 14, the chilled water exchanges heat with the refrigerant and its temperature drops. After coming out from the third heat exchanger 14, it flows out from the water supply end of the heat pump unit of heat source tower. In this mode, none of the air circuit, the regenerative solution heating circuit and the vacuum maintenance circuit works.

The heating operation of the heat pump of heat source tower in winter has three modes. Heating operation mode 1: When the humidity of the air is low or the amount of the water entering into the solution from air in the heat source tower 31 is small, or in other words, the solution does not need to be regenerated, the compressor 1 sucks refrigerant gas with low temperature and low pressure from the gas-liquid separator 15 and compresses it into overheated steam with high temperature and high pressure. The overheated steam with high temperature and high pressure is discharged, passes through the first solenoid valve 2 (at the moment, the second solenoid valve 3 is closed) and the four-way valve 5 and enters into the third heat exchanger 14 where the refrigerant releases heat to produce hot water and be condensed into liquid. The liquid then passes through the second check valve 8, the reservoir 9, the filter 10 and the electronic expansion valve 11 and becomes low-temperature low-pressure gas-liquid two-phase. Then it enters the second heat exchanger 6 via the fourth check valve 13. The refrigerant absorbs heat and is evaporated in the second heat exchanger 6. After complete evaporation, the refrigerant becomes overheated gas. The gas comes out from the second heat exchanger 6, passes through the four-way valve 5 and enters into the gas-liquid separator 15. Then again it is sucked into the compressor 1. By now, a heating cycle is completed and hot water is produced. At the moment, the solution circuit is filled with the solution and other parts of the solution circuit except the heat source tower 31, the second solution pump 32, the electric three-way regulating valve 33 and the second heat exchanger 6 stop working. In the solution circuit, after coming out from the heat source tower 31, the solution is sucked in and pressurized by the second solution pump 32. Then it enters into the electric three-way regulating valve 33. The solution all enters into the second heat exchanger 6 from the second output end 33*c* of the electric three-way regulating valve. In the second heat exchanger 6, it exchanges heat with the refrigerant to release heat. After temperature drop, it flows out from the second heat exchanger 6 and enters into the heat source tower 31 to exchange heat and humidity with air. After temperature rise, the solution again flows out from the heat source tower 31. The hot water in the cold/hot water circuit enters into the heat pump unit of heat source tower from the return end of the heat pump unit of heat source tower, then passes through the first water pump 16 and enters into the third heat exchanger 14 (at the moment, the third solenoid valve 14 is closed). In the third heat exchanger 14, the hot water exchanges heat with the refrigerant and its temperature rises. After coming out from the third heat exchanger 14, it flows out from the water supply end of the heat pump unit of heat source tower. In this mode, none of the air circuit, the regenerative solution heating circuit and the vacuum maintenance circuit works.

Heating operation mode 2: When the humidity of the air is high or the amount of the water entering into the solution from air in the heat source tower 31 is large, or in other words, the solution needs to be regenerated, the refrigerant gas with low temperature and low pressure in the gas-liquid separator 15 in the refrigerant circuit is sucked in and compressed by the compressor 1 and then discharged into the first heat exchanger 4 via the second solenoid valve 3 (at the moment, the first solenoid valve 2 is closed). The refrigerant in the first heat exchanger 4 exchanges heat with the water used to heat the solution in the solution boiling regenerator 19. After temperature drop, the refrigerant flows out from the first heat exchanger 4, passes through the four-way valve 5 and enters into the third heat exchanger 14 where the refrigerant releases heat to produce hot water and be condensed into liquid. The liquid then passes through the second check valve 8, the reservoir 9, the filter 10 and the electronic expansion valve 11 successively. After throttling and pressure drop, the refrigerant in gas-liquid two-phase enters into the second heat exchanger 6 via the fourth check valve 13. In the second heat exchanger 6, it exchanges heat with the solution, absorbs heat and is evaporated. After complete evaporation, the refrigerant comes out from the second heat exchanger 6, flows through the four-way valve 5 and enters into the gas-liquid separator 15. Again it is sucked in and compressed by the compressor 1, thus completing a cycle. At the moment, the solution circuit is filled with the solution. After coming out from the heat source tower 31, the solution enters into the second solution pump 32 and is pressurized by the second solution pump 32. Then it enters into the electric three-way regulating valve 33. In the electric three-way regulating valve 33, the solution is divided into two channels. In one channel, the solution flows out from the second output end of the electric three-way regulating valve 33c and enters into the second heat exchanger 6 where it exchanges heat with the refrigerant to release heat. After temperature drop, the solution comes out from the second heat exchanger 6 and returns to the heat source tower 31. In the other channel, the solution flows out from the first output end of the electric three-way regulating valve 33b and enters into the heat recoverer 26 where it exchanges heat with the solution flowing into the heat recoverer 26 from the solution boiling regenerator 19. After temperature rise, the solution comes out from the heat recoverer 26 and enters into the solution boiling regenerator 19 where the solution is heated and boiled up and the water in the solution is evaporated. After concentration rise, the solution flows out from the first output end of the solution boiling regenerator 19b, then pressurized in the first solution pump 25 and then enters into the heat recoverer 26 where its temperature drops. After coming out from the heat recoverer 26, the solution returns to the heat source tower 31 via the sixth solenoid valve 28 (at the moment, the fifth solenoid valve 27 and the seventh solenoid valve 30 are closed).

In the regenerative solution heating circuit, the water exchanges heat with the refrigerant in the first heat exchanger 4 and its temperature rises. After coming out from the first heat exchanger 4, water enters into the solution boiling regenerator 19 where it exchanges heat with the solution. After temperature drop, water flows out from the solution boiling regenerator 19 and is sucked in and pressurized by the second water pump 34. Then it again flows into the first heat exchanger 4. It circulates in this way.

In the vacuum maintenance circuit, the vacuum pump 24 is used to vacuumize the compensator 22 and keep the pressure in the compensator 22 within the set pressure range. When the pressure in the compensator 22 is lower than the set value, the vacuum pump 24 does not work and the fourth solenoid valve 23 is closed. When the pressure in the compensator 22 is higher than the set value, the vacuum pump 24 works and the fourth solenoid valve 23 is opened; the compensator 22 and the pressure regulating valve 21 are used to regulate the working pressure in the air circuit, i.e.: control the working pressure in the solution boiling regenerator 19, keep the solution in the solution boiling regenerator 19 boiling all the time and realize fast regeneration of the solution. When the air circuit works, its internal pressure is lower than atmospheric pressure and is in a vacuum state and the solution in the solution boiling regenerator 19 is heated. Under working pressure in the air circuit, the solution will boil up and steam will enter into the air circuit to form highly humid air. After flowing out from the solution boiling regenerator 19, the highly humid air enters into the finned tube heat exchanger 18. In the finned tube heat exchanger 18, it exchanges heat with heat supply hot water to produce heat supply hot water (45° C. supply/40° C. return). The temperature of the highly humid air is reduced to below dew point, the water vapor in the air is condensed and the moisture content of the air is reduced. After flowing out from the finned tube heat exchanger 18, the air is sucked in and pressurized by the fan 20 and then enters into the solution boiling regenerator 19. It circulates in this way. At the moment, the eighth solenoid valve 35 is opened, the ninth solenoid valve 37 is closed and the water storage tank 36 is in a water receiving state. When the water level reaches a specific height, the eighth solenoid valve 35 is closed and the ninth solenoid valve 37 is opened. After the water in the water storage tank 36 is drained, the ninth solenoid valve 37 is closed again and the eighth solenoid valve 35 is opened. In the cold/hot water circuit, hot water enters into the heat pump unit of heat source tower from the return end of the heat pump unit of heat source tower and then enters into the first water pump 16 where hot water is divided into two channels. In one channel, the hot water enters into the third heat exchanger 14 to exchange heat with the refrigerant and raise temperature. After coming out from the third heat exchanger 14, it flows out from the water supply end of the heat pump unit of heat source tower. In the other channel, the hot water enters into the finned tube heat exchanger 18 via the third solenoid valve 17 to exchange heat with air in it and raise temperature to 45° C. After coming out from the finned tube heat exchanger 18, the hot water is mixed with the hot water coming out from the third heat exchanger 14 and finally flows out from the water supply end of the heat pump unit of heat source tower.

When the heat supply of the heat pump of heat source tower in winter is about to end, the heating operation of the system adopts heating operation mode 3: mode of a highly concentrated solution: The operation of other circuits are the same as that in mode 2. Only in the solution circuit, the fifth solenoid valve 27 is opened, the sixth solenoid valve 28 and the seventh solenoid valve 30 are closed, the solution flowing out from the second output end 26d of the heat recoverer passes through the fifth solenoid valve 27 and flows into the solution reservoir 29 for storage rather than flows into the heat source tower 31 again. When the unit carries out heating operation in winter again and the solution in the solution reservoir 29 needs to flow into the heat source tower 31, the fifth solenoid valve 27 is closed and the seventh solenoid valve is opened.

In heating operation mode 1 of the system, there is no need to regenerate the solution and the system runs efficiently without initiation of solution regeneration.

In heating operation mode 2 of the system, solution regeneration uses the heat released from the cooling of overheated refrigerant. By controlling the electric three-way regulating valve 33, the flow of the solution entering the second heat exchanger 6 and the heat recoverer 26 is regulated, thus the volume of the solution to be regenerated is regulated and the flow, temperature and concentration of the solution entering into the solution boiling regenerator 19 are controlled. Meanwhile, by using the vacuum maintenance circuit, the working pressure of the air circuit, i.e., the pressure in the solution boiling regenerator 19 is regulated, it is ensured that the solution in the solution boiling regenerator 19 can be heated till boiling under this pressure and meanwhile the operating temperature in each part of the closed air circuit is regulated. As a result, while the system achieves optimum regeneration efficiency, the concentration of the flowing solution is maintained stably. Further, the heat released by water vapor in the air through condensation in the finned tube heat exchanger 18 in the air circuit is used to heat the heat supply hot water and realize efficient utilization of regenerated heat.

The invention claimed is:

1. A heat pump of heat source tower realizing solution regeneration and heat reutilization based on vacuum boiling, wherein the heat pump comprises a refrigerant circuit, a solution circuit, a vacuum maintenance circuit, an air circuit, a regenerative solution heating circuit and a cold/hot water circuit;

the refrigerant circuit comprises a compressor, a first solenoid valve, a second solenoid valve, a first heat exchanger, a four-way valve, a second heat exchanger, a first check valve, a second check valve, a reservoir, a filter, an electronic expansion valve, a third check valve, a fourth check valve, a third heat exchanger, a gas-liquid separator and relevant connecting pipelines; the first heat exchanger is also a component of the regenerative solution heating circuit, the second heat exchanger is also a component of the solution circuit, and the third heat exchanger is also a component of the cold/hot water circuit;

in the refrigerant circuit, an output end of the compressor is divided into two channels, one channel is connected to a first input end of the first heat exchanger via the second solenoid valve, the other channel is connected to a first input end of the four-way valve via the first solenoid valve, the first input end of the four-way valve is also connected to a first output end of the first heat exchanger, and a first output end of the four-way valve is connected to a first input end of the second heat exchanger, a first output end of the second heat exchanger is connected to an inlet of the first check valve, an outlet of the first check valve is divided into two channels, one channel is connected to an input end of the reservoir, the other channel is connected to the outlet of the second check valve, an inlet of the second check valve is connected to a first output end of the third heat exchanger, an output end of the reservoir is connected to an input end of the electronic expansion valve via the filter, an output end of the electronic expansion valve is divided into two channels, one channel is connected to the inlet of the third check valve, the other channel is connected to an inlet of the fourth check valve, an outlet of the third check valve is also connected to the first output end of the third heat exchanger, the outlet of the fourth check valve is connected to the first output end of the second heat exchanger and an inlet of the first check valve, a first input end of the third heat exchanger is connected to a second input end of the four-way valve, a second output end of the four-way valve is connected to an input end of the gas-liquid separator, an output end of the gas-liquid separator is connected to an input end of the compressor;

the solution circuit comprises the second heat exchanger, a solution boiling regenerator, a first solution pump, a heat recoverer, a fifth solenoid valve, a sixth solenoid valve, a solution reservoir, a seventh solenoid valve, a heat source tower, a second solution pump, an electric three-way regulating valve and relevant connecting pipelines, the solution boiling regenerator is also a component of the air circuit and vacuum maintenance circuit;

in the solution circuit, a solution output end of the heat source tower is connected to an inlet of the second solution pump, an outlet of the second solution pump is connected to an input end of the electric three-way regulating valve, a first output end of the electric three-way regulating valve is connected to a first input end of the heat recoverer, a first output end of the heat recoverer is connected to a first input end of the solution boiling regenerator, a first output end of the solution boiling regenerator is connected to a second input end of the heat recoverer via a first solution pump, a second output end of the heat recoverer is divided into two channels, one channel is connected to a first input end of the heat source tower via the sixth solenoid valve, the other channel is connected to an input end of the solution reservoir via the fifth solenoid valve, an output end of the solution reservoir is connected to a second input end of the heat source tower via the seventh solenoid valve, a second output end of the electric three-way regulating valve is connected to a second input end of the second heat exchanger, and a second output end of the second heat exchanger is also connected to the first input end of the heat source tower;

the vacuum maintenance circuit comprises the solution boiling regenerator, a pressure regulating valve, a compensator, a third solenoid valve, a vacuum pump and relevant connecting pipelines, in the vacuum maintenance circuit, a pressure regulating end of the solution boiling regenerator is connected to a first port of the compensator via the pressure regulating valve, and a second port of the compensator is connected to an inlet of the vacuum pump via the third solenoid valve;

the air circuit comprises a finned tube heat exchanger, the solution boiling regenerator and a fan which are connected successively as well as the pipelines connecting the finned tube heat exchanger, the solution boiling regenerator and the fan, they form a circulation circuit, a condensed water output end of the finned tube heat exchanger is connected to an input end of the water storage tank via the eighth solenoid valve, an output end of the water storage tank is connected to a ninth solenoid valve, and the finned tube heat exchanger is also a component of the cold/hot water circuit;

the regenerative solution heating circuit comprises a second water pump, the solution boiling regenerator, a first heat exchanger and relevant connecting pipelines, in the regenerative solution heating circuit, a second output end of the first heat exchanger is connected to a second input end of the solution boiling regenerator, a second output end of the solution boiling regenerator is connected to an inlet of the second water pump, and an outlet of the second water pump is connected to a second input end of the first heat exchanger;

the cold/hot water circuit comprises a first water pump, a third solenoid valve, the finned tube heat exchanger, a third heat exchanger and relevant connecting pipelines, in the cold/hot water circuit, an inlet of the first water pump is connected to a return end of the heat pump unit of heat source tower, an outlet of the first water pump is divided into two channels, one channel is connected to a second input end of the third heat exchanger, the other channel is connected to a hot/cold water input end of the finned tube heat exchanger via the third solenoid valve, a hot/cold water output end of the finned tube heat exchanger is connected to a water supply end of the heat pump unit of heat source tower, and a second output end of the third heat exchanger is also connected to the water supply end of the heat pump unit of heat source tower.

2. The heat pump of claim 1, wherein the heat pump is configured such that the flow of the solution entering into the second heat exchanger and the heat recoverer is regulated by controlling the electric three-way regulating valve so as to the flow, temperature and concentration of the solution entering into the boiling solution regenerator are controlled, consequently, while the heat pump unit of heat source tower achieves optimum regeneration efficiency, the concentration of the flowing solution is maintained stably.

3. The heat pump of claim 1, wherein the heat pump is configured such that the working pressure in the solution boiling regenerator is regulated by using the compensator and the pressure regulating valve, the regeneration temperature and speed of the solution are controlled.

4. The heat pump of claim 1, wherein the heat pump is configured such that heat released from the cooling of overheated refrigerant in the first heat exchanger is used as regeneration heat of the solution, based on the regenerative solution heating circuit, the solution in the solution boiling regenerator is heated and boiled up to realize solution regeneration.

5. The heat pump of claim 1, wherein the heat pump is configured such that, in the finned tube heat exchanger in the air circuit, the heat released from condensation of water in the air is used to heat the hot water in the cold/hot water circuit and realize reutilization of solution regeneration heat.

6. The heat pump of claim 1, wherein an air outlet of the heat source tower is configured to automatically open and close, wherein, in working time, the air outlet is automatically opened, and wherein, in non-working time, the air outlet is automatically closed to prevent rainwater from entering into the tower.

* * * * *